(12) United States Patent
Cole

(10) Patent No.: US 6,723,145 B2
(45) Date of Patent: Apr. 20, 2004

(54) OPEN POWDER BOOTH COLLECTION DESIGN

(75) Inventor: David J. Cole, Canton, MI (US)

(73) Assignee: Dürr Industries, Inc., Plymouth, MI (US)

(*) Notice: Subject to any disclaimer, the term of this patent is extended or adjusted under 35 U.S.C. 154(b) by 125 days.

(21) Appl. No.: 10/039,081

(22) Filed: Jan. 2, 2002

(65) Prior Publication Data

US 2003/0121239 A1 Jul. 3, 2003

(51) Int. Cl.[7] .............................................. B01D 46/00
(52) U.S. Cl. .................... 55/342; 55/350.1; 55/385.1; 55/484; 55/302; 55/DIG. 46; 118/326; 118/DIG. 7; 454/53
(58) Field of Search .............................. 55/302, 385.1, 55/350.1, 467, 473, 484, DIG. 46, 342; 454/50, 51, 52, 53; 118/312, 326, DIG. 7; 427/478

(56) References Cited

U.S. PATENT DOCUMENTS

| | | | | |
|---|---|---|---|---|
| 3,814,002 A | * | 6/1974 | Rombach et al. | 55/DIG. 46 |
| 4,704,953 A | * | 11/1987 | Wilson | 55/DIG. 46 |
| 5,095,811 A | * | 3/1992 | Shutic et al. | 454/53 |
| 5,326,599 A | * | 7/1994 | Shutic | 454/53 |
| 5,591,240 A | * | 1/1997 | Ophardt et al. | 55/DIG. 46 |
| 5,743,958 A | * | 4/1998 | Shutic | 55/DIG. 46 |
| 6,432,173 B1 | * | 8/2002 | Johnson et al. | 118/326 |
| 6,471,737 B2 | * | 10/2002 | Cole et al. | 55/DIG. 46 |
| 2003/0046909 A1 | * | 3/2003 | Cole et al. | 55/385.1 |

FOREIGN PATENT DOCUMENTS

EP    1070546 A2    1/2001

* cited by examiner

Primary Examiner—Duane Smith
Assistant Examiner—Jason M. Greene
(74) Attorney, Agent, or Firm—Howard & Howard

(57) ABSTRACT

An under booth paint collection apparatus is positioned beneath a paint application booth that includes an air circulation system for painting a product with particulate paint. A plurality of discrete powder reclamation collectors are arranged in aligned rows beneath the booth. Continuously aligned air chambers are each positioned above one of the opposing rows of reclamation collectors. Each air chamber is defined by having opposed continuous side walls interconnecting said reclamation collectors. Each air chamber provides a continuous air plenum directing air and particulate paint not adhered to the product being painted from the application booth to the plurality of discrete reclamation chambers.

15 Claims, 5 Drawing Sheets

OPEN POWDER BOOTH COLLECTION DESIGN

BACKGROUND OF THE INVENTION

The subject invention relates generally to an improved powder paint collection apparatus for use with a production powder paint application booth.

The application of powder paint has become an increasingly utilized method of painting mass production products, such as automobiles, to reduce the amount of volatile organic compound emissions from a production paint facility. A typical powder paint booth includes a powder paint reclamation system that increases the paint use efficiency upwards of 95%. This type of reclamation system includes a reclamation collector positioned beneath each zone of the paint both. Each zone will generally include several discrete collectors positioned along the length of the zone.

A sectional view of a typical powder application booth is generally shown at 10 in FIG. 1. Each reclamation collector 12 generally includes three sections. A lower section 14 functions as a hopper and collects powder paint funneled into the reclamation collector 12 to be returned the powder reclamation feed system (not shown) as is known to those of skill in the art of powder painting. A filter section 16 is disposed above the lower section 14 and includes a plurality of air filters 18 that are fluidly connected to an air return plenum 20, which returns air to an air inlet plenum (not shown) ultimately to create a downward draft of air inside the powder paint booth.

Each of the prior art reclamation collectors 12 includes a separate air chamber 22 that rises from the filter section 16 to a porous floor 24 of the paint booth 10. Funnel walls 26 expand upwardly and outwardly from the filter section 16 and terminate at the porous floor 24 to collect powder paint particles and air from the entire surface of the porous floor 24 and funnel the particles and air into the lower section 14 and the filter section 16.

While the prior art reclamation collector design has proven somewhat adequate, it has also demonstrated many drawbacks. The separate funnel like air chambers 22 create areas of inconsistent pressure of air circulated through the plenum that disrupts the airflow throughout the booth. A consistent downward draft of air is critical to the paint quality of the product being painted in the booth. Inconsistency in the air pressure within the booth results in inconsistent paint coverage and other paint defects that require repairs to be made to the product. Further, the prior art reclamation collector design results in dead zones both in the reclamation collector and in the paint booth. Dead zones result in accumulations of particulate paint and other dirt that ultimately result in dirt type defects in the product being painted.

Therefore, it would be desirable to provide a reclamation collector apparatus that does not have design dimensions that adversely affect the flow of air through the paint booth. A reclamation collector apparatus that does not adversely affect the flow of air through the paint booth would both improve the efficiency of the paint process by increasing the amount of paint recycled and reduce the number of paint defects on the product by reducing the potential of dirt type defects on the product.

SUMMARY OF THE INVENTION AND ADVANTAGES

The present invention is a powder paint reclamation collector that improves the flow of fluidized paint particles through a paint booth and into a reclamation collector. The paint booth includes an air circulation system with an inlet plenum that provides downward draft of air through the paint booth and into a return plenum that receives filtered air from the reclamation collector to be recirculated through the paint booth. A plurality of discrete powder reclamation collectors are aligned in rows beneath a porous floor of an application chamber. Each collector includes an upper inlet receiving air and paint particles from the booth and a lower outlet for reclaiming particles.

A continuous chamber is positioned above each row of reclamation collectors and is defined by having continuous side walls connecting the inlets of the reclamation collectors. The air chamber provides a continuous air plenum replacing the separate air funnels utilized in the prior art reclamation collectors. Air and particulate paint not adhered to the product is collected in each of the air chambers and is directed by the continuous plenum to the plurality of reclamation chambers.

The utilization of a continuous air chamber that connects each of the reclamation collectors solves the problems identified with the prior art reclamation collector design. The inventive air chamber improves the consistency of the air flow velocity and the air pressure down the entire length of the booth. Further, the open design allows powder to distribute more evenly in the collector filters reducing pressure drop that may occur when one air filter becomes plugged with particulate paint at a quicker rate than the other air filters in a given zone. Still further, the air filters may be positioned directly in a line of the air flow from the supply plenum, and do not need to be offset into external containers that are in fluid communication with the return plenum.

By utilizing a side wall that extends longitudinally along the length of the booth, a significant reduction in the amount of steel, and therefore the amount of surface area of steel in the booth, can be achieved. The reduction in surface area of steel reduces the potential for dead zones that may result in the accumulation of particulate paint, which reduces both transfer efficiency of the paint and results in an increased potential for dirt type defects in the paint finish of the product through the agglomeration of paint particles.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
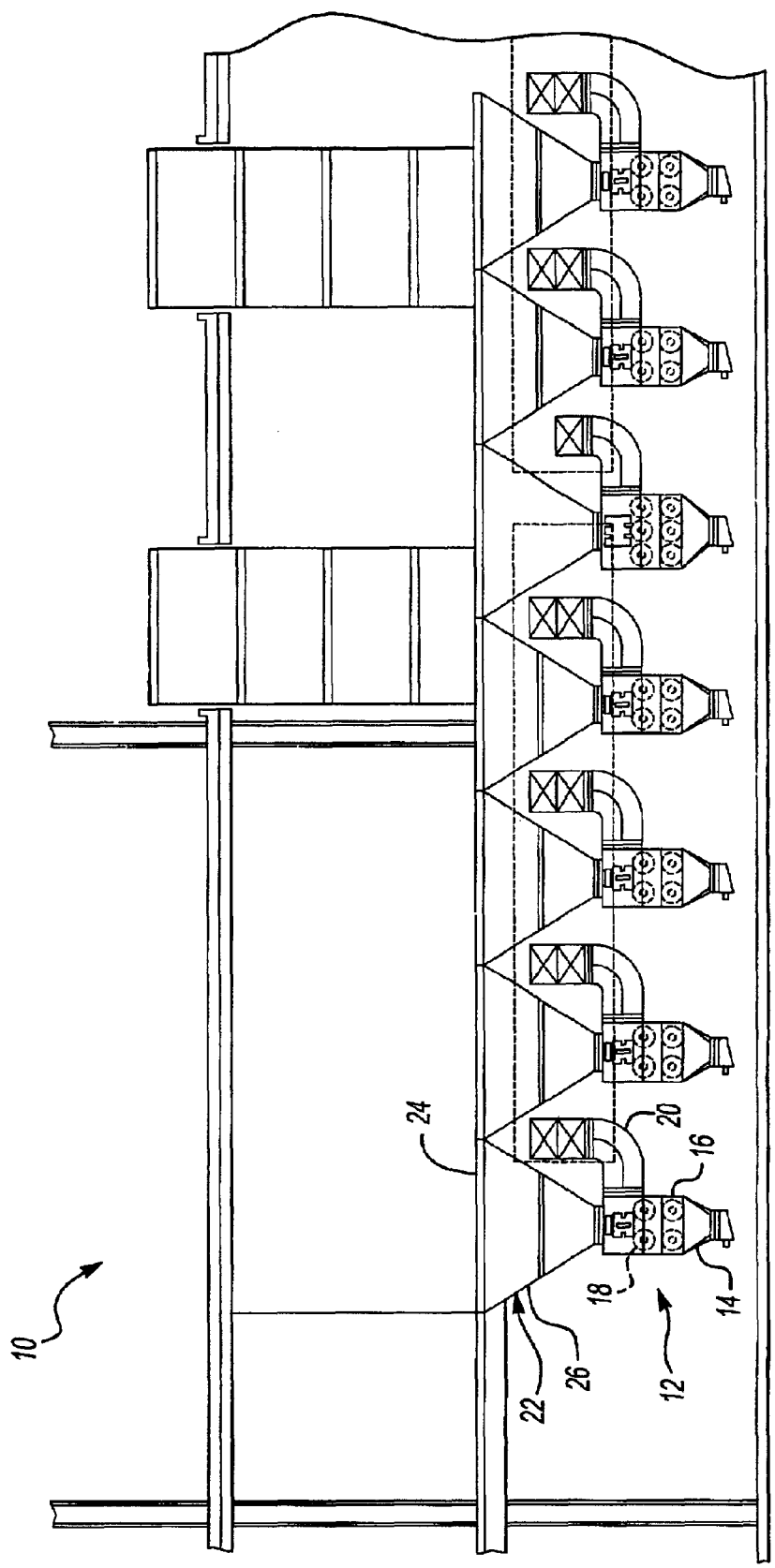
FIG. 1 is a side sectional view of a prior art powder paint reclamation apparatus.
Figure 2:
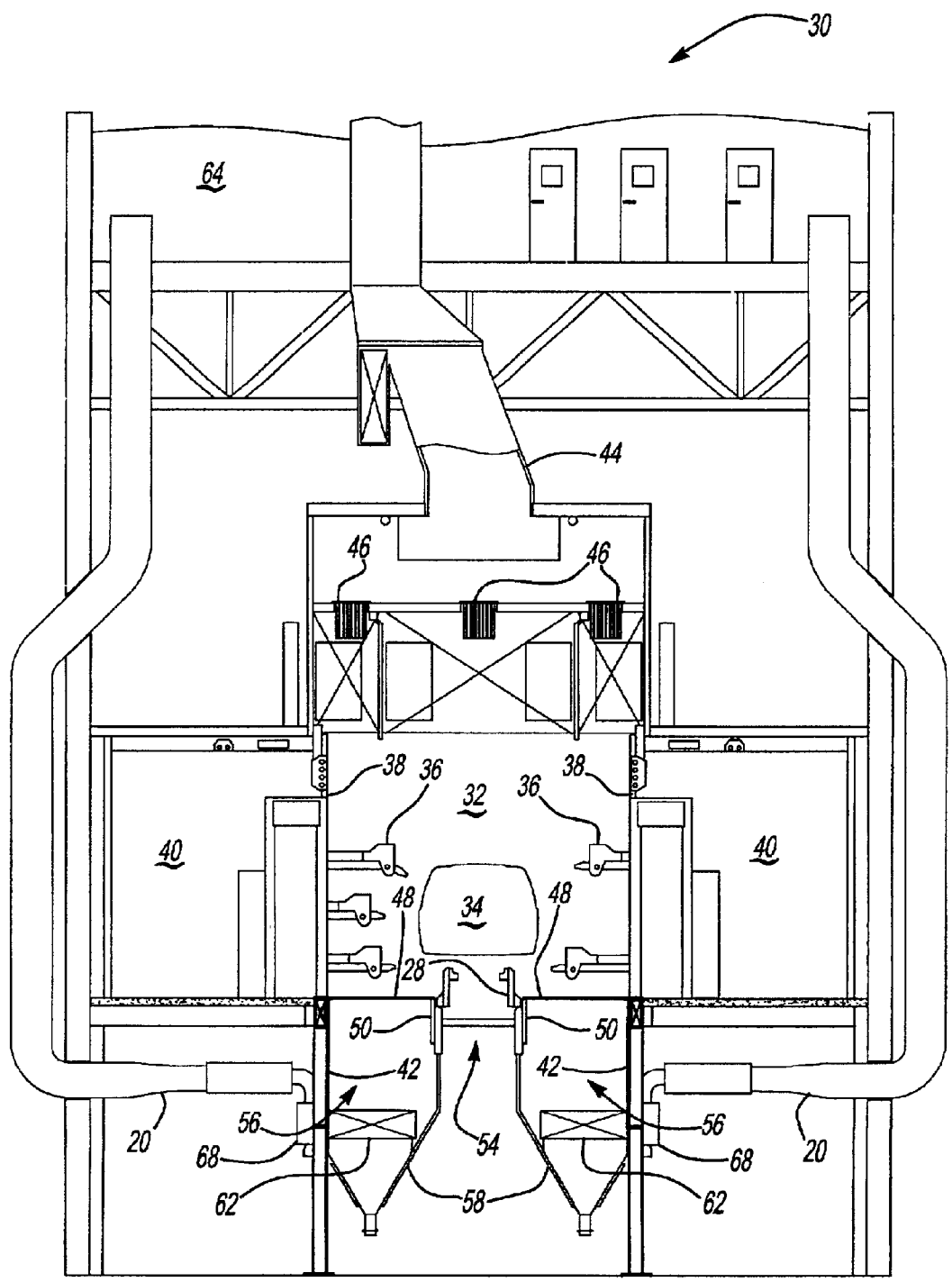
FIG. 2 is a cross-sectional elevation of the paint booth assembly showing the collector of the subject invention.

Referring to FIG. 2 a cross-section of a booth assembly for applying powder paint is generally shown at 30. The booth includes a paint application chamber 32 wherein the powder paint is applied to a vehicle body 34 or other product. The application chamber 32 forms an elongated room into which the bodies 34 are conveyed for painting. A conveying device 28, such as, for example a conveyor, moves the products 34 through the application chamber 32. Paint application equipment 36 is disposed within the chamber 32 for applying the powder paint as is known in the art of powder painting. The application chamber 32 is enclosed by opposed walls 38, which separate the chamber 32 from control rooms 40 positioned on either side of the application chamber 32. The walls 38 are supported from below by a plurality of support members 42 that are arranged end to end along the entire length of the assembly 30. An air supply plenum 44 is affixed above the assembly 30 to provide fresh air to the application chamber 32. Inlet filters 46 are disposed within the plenum 44 to remove impurities from the fresh air that would otherwise result in paint defects on the car body 34. The fresh air provides a downward draft to the chamber 32 to force powder paint particles not adhered to the product 34 downward and out of the chamber 32.

A plurality of grates 48 form the porous floor of the application chamber 32. The grates 48 are supported on one end by a conveyor support beam 50 and the other end by the support members 42. The support system is further disclosed in a co-pending U.S. patent application Ser. No. 09/728,337. The conveying device 28 operates in a channel 54 between the parallel conveyor support beams 50. The grates 48 allow air from the air supply plenum 44 and paint particles that have not adhered to the body 34 to pass through and into opposing air chambers 56.

Figure 3:
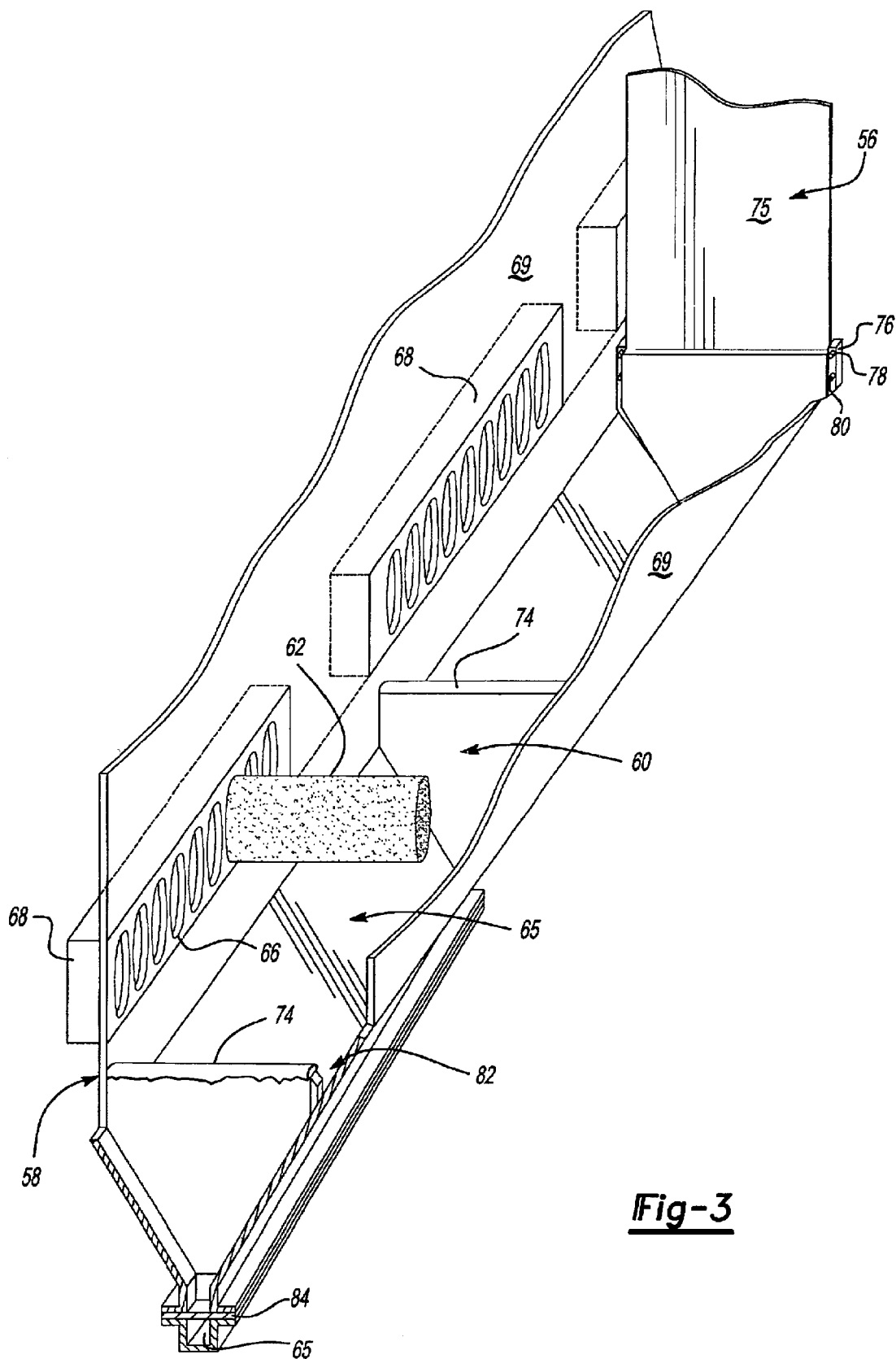
FIG. 3 is a perspective view of the reclamation collector of the subject invention.
Figure 4:
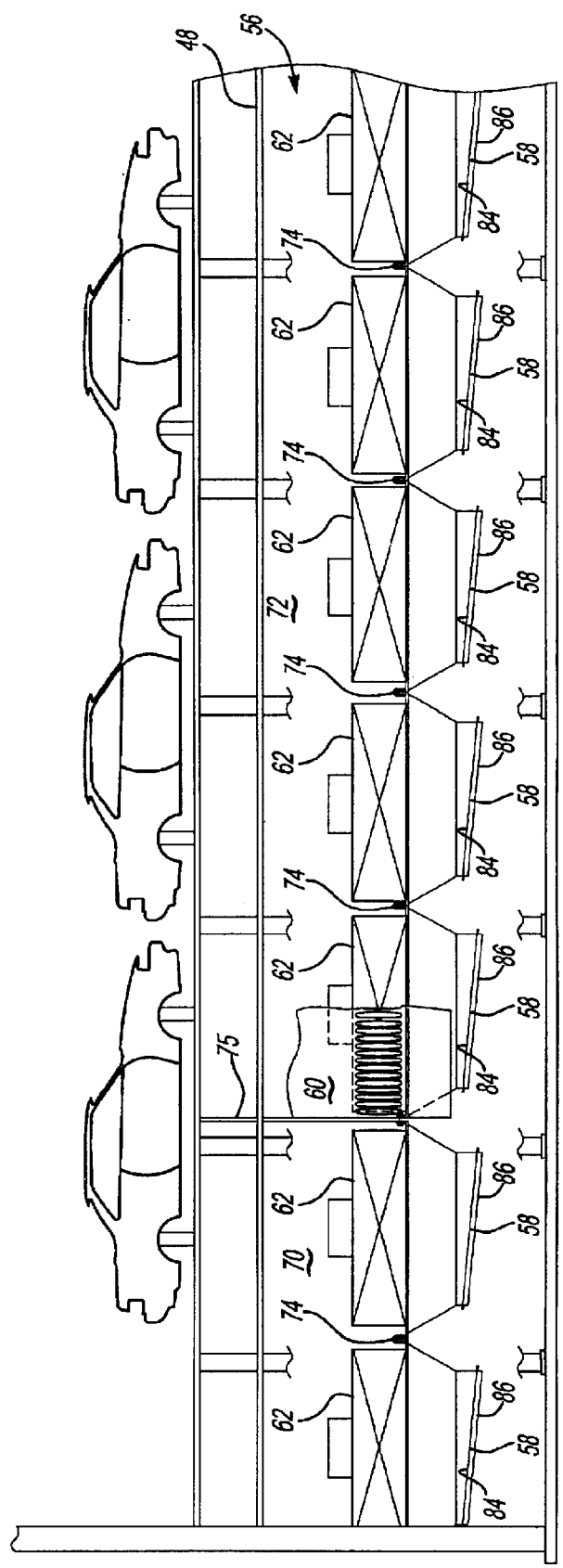
FIG. 4 is a side sectional view of the powder reclamation apparatus of the subject invention showing separateness.
Figure 5:
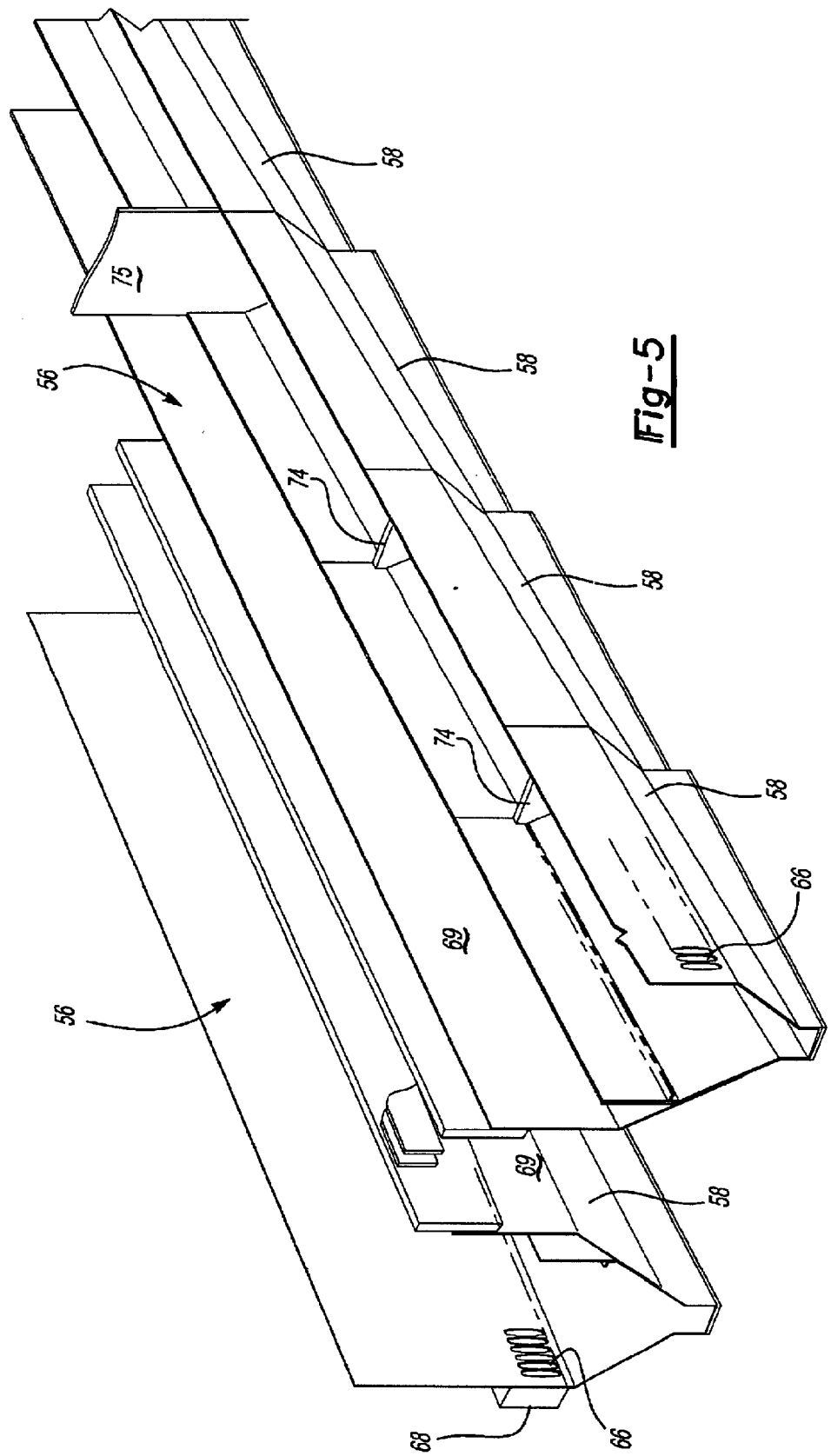
FIG. 5 is a perspective view of the inventive continuous air chamber.

FIGS. 3, 4 and 5 show a continuous air chamber 56 disposed beneath each of the grates 48 (FIG. 4) thereby enclosing the bottom of the booth assembly 30 (FIG. 2). The continuous air chamber 56 includes opposed continuous side walls 69 that interconnect inlets 65 of discrete powder paint collectors 58. The continuous air chamber 56 defines a continuous air plenum communicating with opposing rows of collectors 58 for directing air and particulate paint not adhered to the product 34 into each of the reclamation collectors 58 as will be explained further below.

The plurality of discrete powder reclamation collectors 58 enclose the bottom of each air chamber 56 preventing air and particulate paint from escaping out of the booth assembly 30 (FIG. 2) and into the environment surrounding the booth assembly 30. Each reclamation collector 58 defines a filter chamber 60 wherein a plurality of air filters 62 are disposed. Air is drawn through the air filter 62 and into the air return plenum 20 and routed through a filter house 64 before being returned to the air supply plenum 44.

As best shown in FIGS. 3 and 4, each reclamation collector 58 includes a plurality of slots 66 disposed in a side wall 68 of the filter chamber 60. An air filter 62 is inserted in each slot 66 to prevent powder paint particles from exiting the reclamation collector 58 through one of the slots 66. The air return plenum 20 draws air through the filters 62 and subsequently through the slots 66. Alternatively, some of the slots 66 may be covered to prevent the particulate paint from exiting the reclamation collector 58. The number of air filters 62 utilized depend upon the amount of air required to exit the booth assembly 30 to balance the flow of air through the air assembly 30.

Preferably, a filter is utilized to filter the particulate paint from the return air routed through the air return plenum 20 such as is available from Herding Filter Company. The Herding filter utilizes sintered filtering technology that provides a uniform pressure drop over the entirety of the filter 62 surface area. It will be understood by those of skill in the art that other types of filters providing similar properties may also be used.

Referring again to FIG. 2, an air supply baffle 68 provides a pulse of air in a direction opposite to that of the flow of air through the return plenum 20 to displace particulate powder collected on the surface of the air filter 62. The pulse of air may be initiated on a cyclical schedule or may be initiated upon detection of a pressure drop in the return plenum 20.

FIG. 4 shows a side partial sectional view of the booth assembly 30 of the present invention. The booth assembly 30 is shown having a first application zone 70 and a second application zone 72. Within each zone 70, 72 adjacent reclamation collectors 58 are adjoined by a common panel 74 bowed to define separate surfaces within each of the reclamation collectors 58. Therefore, within each zone 70, 72, the continuous air chamber 56 defines an open area.

Because each zone may contain a different powder paint, such as, for example reclaim, virgin, and color specific paint, the zones must be physically separated to prevent contamination from one zone 70, 72 to the adjacent zone 72, 70. Accordingly, a divider wall 75 is positioned between each zone across a width of the air chamber 56. The wall 75 is positioned between adjacent reclamation collectors 58 from each zone 70, 72. Otherwise, the adjacent reclamation collectors 58 from each zone 70, 72 would abut. Each of the adjacent reclamation collectors 58 include a flange 76 (FIG. 3), which abut at the periphery of the wall 74. The abutting flanges 76 each include a plurality of apertures 78 that align to define a hole through which a fastener 80 may be inserted to adjoin the adjacent reclamation collectors 58.

Each reclamation collector 58 defines a fluidizing chamber 82 disposed beneath the filter chamber 60. As disclosed in U.S. patent application Ser. No. 09/748,222 the fluidizing chamber 82 includes a porous plate 84 through which fluidizing air is dispersed from an air inlet line 58 providing enough turbulence in the reclamation collector 58 to maintain powder particles in a fluidized state. Each reclamation collector 58 includes a base 86 angled downwardly toward a reclamation return line (not shown) through which reclaimed powder paint particles are returned to a reclamation apparatus (not shown) to be reapplied to the product being painted as is known to those of skill in the art of powder paint application.

The invention has been described in an illustrative manner, and it is to be understood that the technology which has been used is intended to be in the nature of words of description rather than of limitation.

Obviously, many modifications and variations of the present invention are possible in light of the above teachings. It is, therefore, to be understood that within the scope of the amended claims wherein reference numerals are merely for convenience and are not to be in any way limiting, the invention may be practice otherwise and as specifically described.

What is claimed is:

1. An underbooth powder paint collection apparatus positioned beneath a paint application booth having an air circulation system for painting a product with particulate paint, said apparatus comprising:

a plurality of discreet powder reclamation collectors arranged in aligned rows beneath said booth, wherein each collector includes an upper inlet receiving air and paint particles from said booth and a lower outlet for reclaiming paint particles; and continuous aligned air chambers having opposed continuous side walls interconnecting said reclamation chambers and said inlets of said powder reclamation collectors divided into zones by a wall across a width of said air chamber providing a continuous air plenum communicating with a plurality of said collectors for directing air and particulate paint not adhered to the product into said discreet powder reclamation collectors including abutting flanges matable for affixing adjacent said powder collectors together.

2. An assembly as set forth in claim 1, wherein each of said reclamation collectors defines a filter chamber including at least one air filter inserted therein being fluidly connected to said air circulation system.

3. An assembly as set forth in claim 2, wherein said collectors each include an air supply pressurized to produce a pulse thereby removing powder paint collected upon said at least one air filter.

4. An assembly as set forth in claim 2, wherein each of said filter chambers includes a side wall defining at least one aperture having said air filter inserted therethrough, said at least one air filter sealing said aperture thereby preventing particulate paint from escaping from said reclamation collectors.

5. An assembly as set forth in claim 1, wherein adjacent of said reclamation collectors are adjoined by a common panel bowed to define a separate surface in each of said adjacent collectors.

6. An assembly as set forth in claim 1, wherein said abutting flanges each define at least one aperture alignable for receiving a fastener to mate said abutting powder collectors.

7. An underbooth powder collection apparatus positioned beneath a paint application booth having an air circulation system for painting a product with particulate paint, said apparatus comprising:

at least two spaced rows of adjacent discreet powder reclamation collectors having opposed generally parallel side walls and opposed generally abutting end walls, an upper inlet and a lower outlet for reclaiming paint particles; and a separate continuous air chamber above each of said rows of discreet powder reclamation collectors having generally parallel side walls joining said side walls of said powder reclamation collectors providing a continuous air plenum bridging said inlets of said discreet powder reclamation collectors having an inlet receiving air and particulate paint from said paint application booth and a continuous outlet directing air and particulate paint into said inlets of said powder reclamation collectors.

8. An assembly as set forth in claim 7, wherein each of said discrete reclamation collectors defines a filter chamber having at least one air filter inserted therein and being fluidly connected to said air return plenum to filter the powder paint from the air being received from said reclamation collectors through said air return plenum.

9. An assembly as set forth in claim 8, wherein said collectors each includes an air supply pressurized to produce a pulse thereby removing powder paint collected upon said at least one air filter.

10. An assembly as set forth in claim 8, wherein each of said filter chambers includes a side wall defining at least one aperture having said air filter inserted therethrough, said at least one air filter sealing said aperture thereby preventing air or particulate paint from escaping from said reclamation collectors.

11. An assembly as set forth in claim 7, wherein adjacent of said reclamation collectors are adjoined by a common panel bowed to define a separate surface in each of said adjacent collectors.

12. An assembly as set forth in claim 7, wherein each of said continuous air chambers is separable into zones for capable of directing air and particulate paint to separate powder collectors.

13. An assembly as set forth in claim 12, wherein adjacent of said zones are separated in said continuous air chamber by a wall positioned across a width of said air chamber.

14. An assembly as set forth in claim 13, wherein adjacent of said reclamation powder collectors of adjacent zones abut and include adjacent flanges matable for affixing said abutting powder collectors together.

15. An assembly as set forth in claim 14, wherein adjacent said powder collectors of adjacent zones abut and include abutting flanges matable for affixing adjacent said powder collectors together.

* * * * *